(12) United States Patent
Hobbs et al.

(10) Patent No.: US 8,136,410 B2
(45) Date of Patent: Mar. 20, 2012

(54) SENSOR ASSEMBLY FOR A FLUID FLOWMETER

(75) Inventors: Paul Hobbs, Hemet, CA (US); Joseph L. Clements, Fairfield, PA (US); Gerald E. Davis, Hemet, CA (US); Eric Dahl Mikkelsen, Hemet, CA (US)

(73) Assignee: Mccrometer, Inc., Hemet, CA (US)

( * ) Notice: Subject to any disclaimer, the term of this patent is extended or adjusted under 35 U.S.C. 154(b) by 219 days.

(21) Appl. No.: 12/683,266

(22) Filed: Jan. 6, 2010

(65) Prior Publication Data

US 2011/0162459 A1    Jul. 7, 2011

(51) Int. Cl.
*G01F 1/58* (2006.01)

(52) U.S. Cl. .................................... 73/861.12

(58) Field of Classification Search ............... 73/861.11, 73/861.12, 861.15–861.17, 861.63, 861.08
See application file for complete search history.

(56) References Cited

U.S. PATENT DOCUMENTS

| | | | |
|---|---|---|---|
| 3,668,931 A | 6/1972 | Zanker et al. | |
| 3,775,673 A | 11/1973 | Watanabe | |
| 3,885,433 A | 5/1975 | Marsh | |
| 4,322,982 A | 4/1982 | Müller et al. | |
| 4,459,858 A | 7/1984 | Marsh | |
| 4,688,432 A | 8/1987 | Marsh | |
| 5,090,250 A * | 2/1992 | Wada | 73/861.12 |
| 5,224,394 A * | 7/1993 | Kalinoski | 73/861.12 |
| 5,398,552 A * | 3/1995 | Marsh | 73/861.12 |
| 5,557,051 A | 9/1996 | Schalk | |
| 5,767,418 A * | 6/1998 | Davis | 73/861.12 |
| 5,905,207 A | 5/1999 | Schalk | |
| 5,925,830 A | 7/1999 | Schalk | |
| 6,571,642 B1 | 6/2003 | Feller | |
| 6,598,487 B1 * | 7/2003 | Marsh | 73/861.12 |
| 6,626,048 B1 | 9/2003 | Dam Es et al. | |
| 6,722,207 B1 | 4/2004 | Feller | |
| 7,055,396 B1 | 6/2006 | Thai et al. | |
| 7,251,877 B2 | 8/2007 | Thai et al. | |
| 7,451,663 B2 * | 11/2008 | Kimball et al. | 73/861.63 |

FOREIGN PATENT DOCUMENTS

EP    1 365 215 A2    11/2003

* cited by examiner

*Primary Examiner* — Jewel V Thompson
(74) *Attorney, Agent, or Firm* — Greer, Burns & Crain, Ltd.

(57) ABSTRACT

A sensor assembly for a fluid flowmeter including a body having a hollow interior where the body is configured to have a moisture impermeable barrier that prevents moisture from entering the interior at extreme fluid pressures. The assembly includes at least one electrode that is mounted on the body and a coil assembly configured to be removably inserted in the hollow interior of the body, where the coil assembly includes at least one magnetic coil electrically isolated from the at least one electrode when the coil assembly is inserted into the hollow interior of the body.

17 Claims, 4 Drawing Sheets

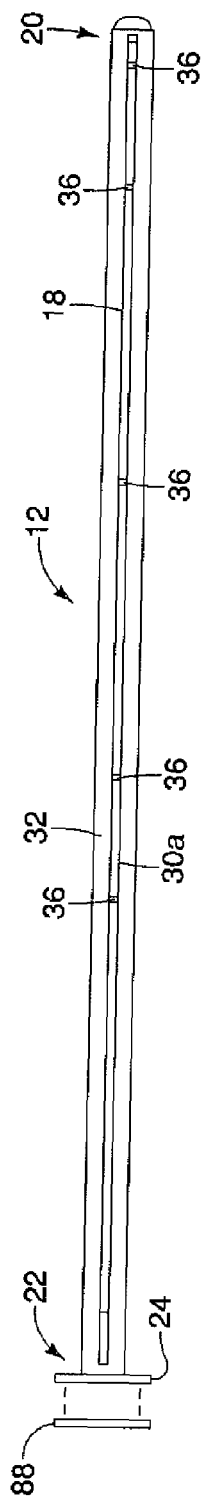
FIG. 5A
FIG. 5B
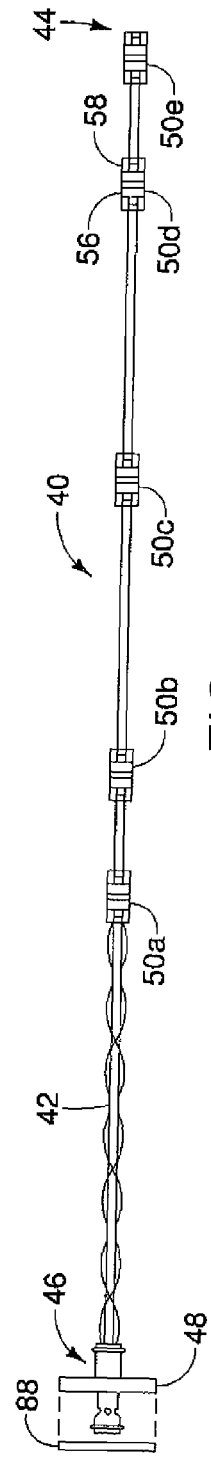
FIG. 6A
FIG. 6B
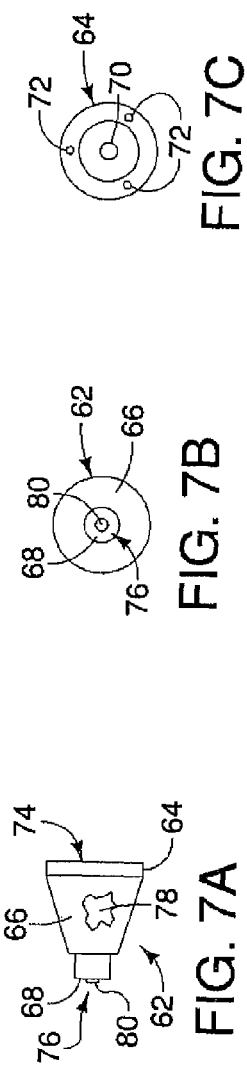
FIG. 7A
FIG. 7B
FIG. 7C

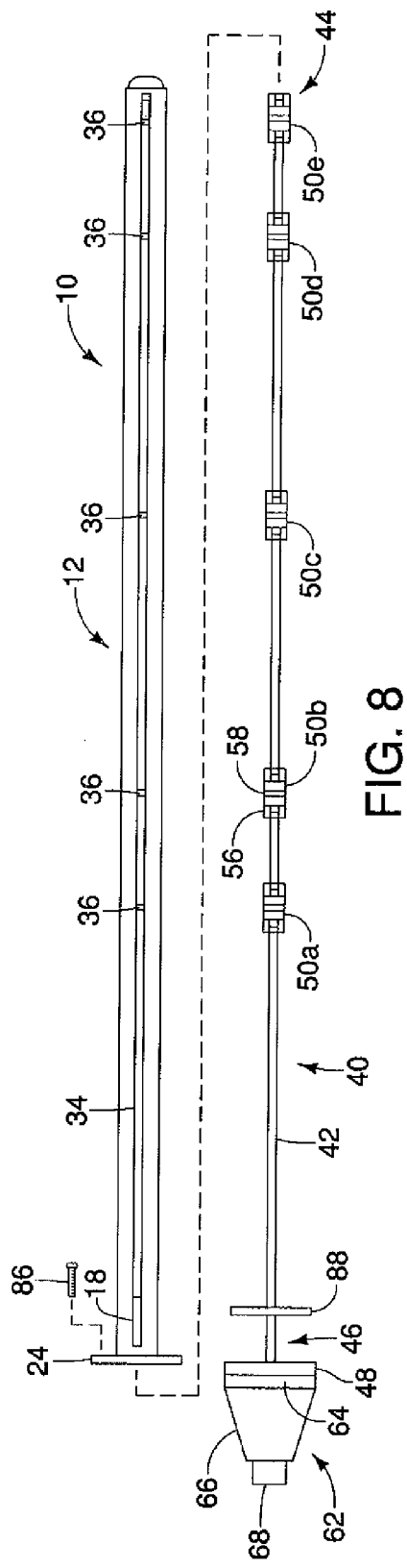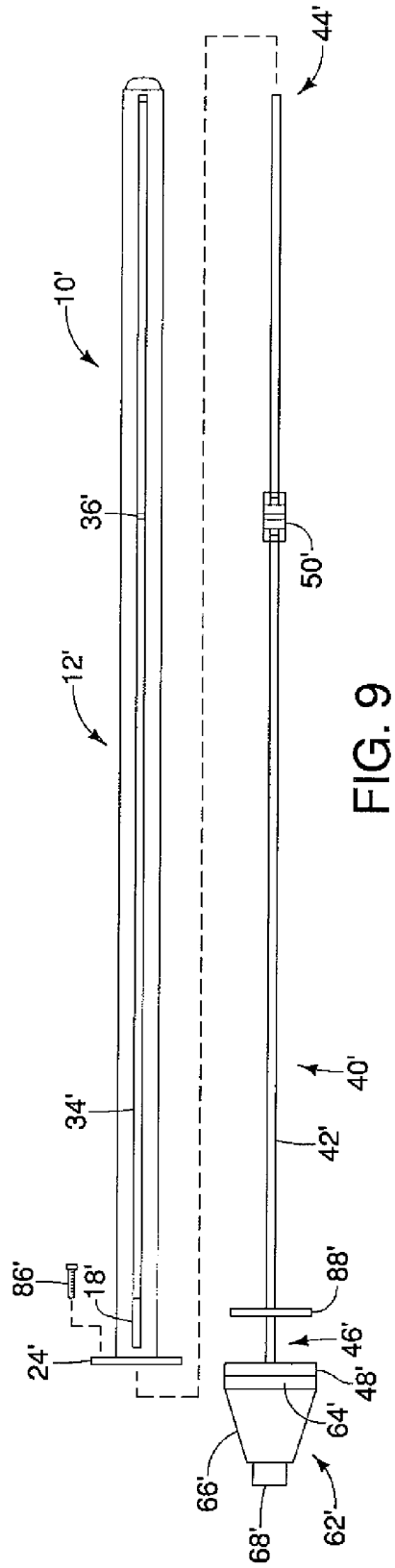

SENSOR ASSEMBLY FOR A FLUID FLOWMETER

BACKGROUND

The present invention relates generally to magnetic flowmeters and, more particularly, to a magnetic flowmeter having a sensor assembly that forms a moisture barrier while providing accurate flow measurements.

Magnetic flowmeters are used to measure the flow of electrically conductive fluids such as water through a conduit or pipeline. Such flowmeters measure the flow or velocity of the fluid moving through the pipeline by using Faraday's Law. Faraday's Law states that a conductor moving through a magnetic field produces a voltage. For example, water is a conductor so it produces a voltage when it passes through a magnetic field. The magnitude of the voltage is directly proportional to the velocity at which the fluid, i.e., water, moves through the magnetic field.

Conventional flowmeters include electromagnetic coils inside a sensor that produce magnetic fields, and electrodes on the sensor that measure the voltage generated by a fluid moving through those magnetic fields. The planes of the magnetic fields are typically oriented transverse so that a conductive fluid passes through the magnetic fields, a voltage is induced. The flowmeters typically include a plurality of electrodes that are spaced apart from each other and in electrical contact with the fluid to measure the induced voltage. The measured voltage is used to determine the average velocity of the fluid flowing through the conduit.

Most flowmeters include a sensor or sensor assembly including a magnetic source and one or more sets of electrodes. The sensor assembly is positioned so that the electrodes are in contact with the fluid flowing through the conduit. To obtain an accurate velocity measurement, it is beneficial to maintain a magnetic field within the measured region between the electrodes. It's also important to prevent moisture from contacting and damaging the interior circuitry, which leads to inaccurate measurements.

Existing flowmeters typically include a body enclosing or extending into the fluid column. The flowmeters incorporate sensing electrodes, one end of which extends into the fluid and an opposing end extends at least partially into the body where wiring connected to the electrodes passes through an interior space in the body that includes the magnetic coils. The openings in the body create a pathway for moisture to enter the interior and expose the inner circuitry to moisture from the fluid in the conduit. The likelihood that moisture will move through the pathway and enter the interior of the sensor increases as the fluid pressure inside the pipeline increases. Such moisture affects the operation of the inner circuitry and leads to inaccurate flow measurements due to malfunction or failure and increases repair and replacement costs. Existing sensors are therefore limited to pipelines having pressures at or below 1000 psi (pounds per square inch). Above 1000 psi, existing sensors are not able to prevent moisture from entering the interior of the sensor. In addition to pressure limitations, some existing sensors have a porous plastic body which also allows moisture to be absorbed by and enter the body over time.

Thus, there is a need for a flowmeter that provides an impermeable barrier against moisture while also providing accurate flow measurements.

SUMMARY

The present sensor assembly provides accurate measurements of fluid flow within a conduit and helps to prevent moisture from damaging the magnetic sensors of the assembly.

An embodiment of the present invention provides a sensor assembly for a fluid flowmeter including a body having a hollow interior where the body is configured to have a moisture impermeable barrier that prevents moisture from entering the interior at extreme fluid pressures. The assembly includes at least one electrode that is mounted on the body and a coil assembly configured to be removably inserted in the hollow interior of the body, where the coil assembly includes at least one magnetic coil electrically isolated from the at least one electrode when the coil assembly is inserted into the hollow interior of the body.

Another embodiment of the present invention provides a sensor assembly for a fluid flowmeter including a cylindrical body having an outer surface, where the body defines a longitudinal axis, a central blind hole and two channels. The two channels are parallel to the longitudinal axis and radially spaced at a designated angle from each other on the outer surface. A sensing electrode assembly is mounted in one of the two channels and a ground electrode assembly is mounted in the other of the two channels, where at least one of the sensing electrode assembly and the ground electrode assembly includes a plurality of spaced electrodes. A coil assembly is configured to be removably inserted in the central blind hole of the body. The coil assembly includes a plurality of magnetic coils, where each of the magnetic coils is electrically isolated from and aligned with one of the plurality of electrodes on the sensing electrode assembly when the coil assembly is inserted into the central blind hole of the body.

DESCRIPTION OF THE SEVERAL VIEWS OF THE DRAWINGS

FIG. 5A is a side view of the body of FIG. 1 showing one of the channels including a sensing electrode assembly.

FIG. 5B is an end view of the body of FIG. 5A.

FIG. 6A is a side view of the coil assembly of FIG. 1.

FIG. 6B is an end view of the coil assembly of FIG. 6A.

FIG. 7A is a side view of the cap shown in FIG. 1.

FIG. 7B is a left side end view of the cap of FIG. 7A.

FIG. 7C is a right side end view of the cap of FIG. 7A.

FIG. 8 is a side exploded view of the sensor assembly showing the coil assembly and cap removed from the body.

FIG. 9 a side exploded view of another embodiment of the sensor assembly.

DETAILED DESCRIPTION

Figure 1:
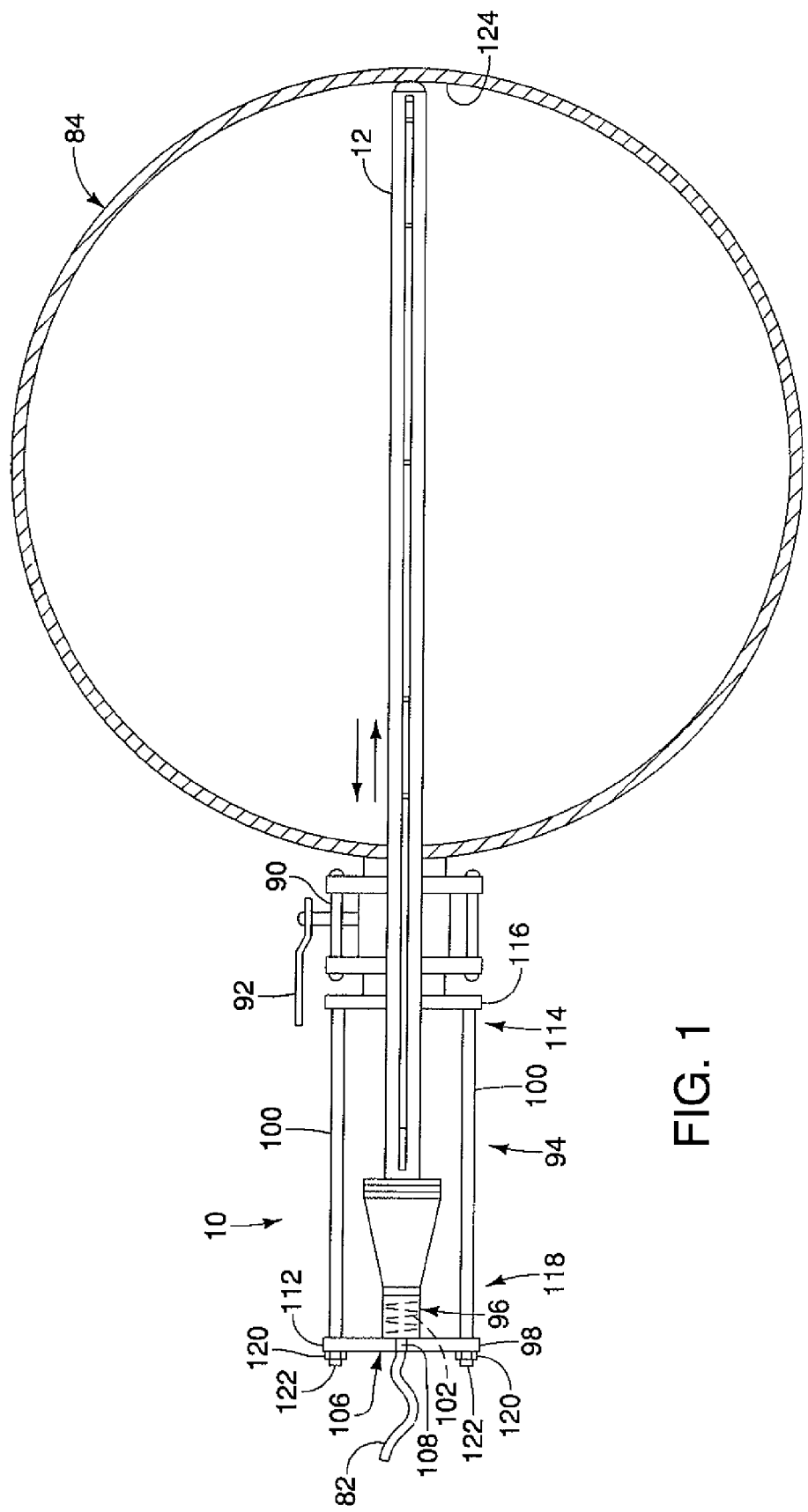
FIG. 1 is a cross-section view of an embodiment of the sensor assembly inserted into a conduit and a mounting assembly that secures the sensor assembly in position.
Figure 4:
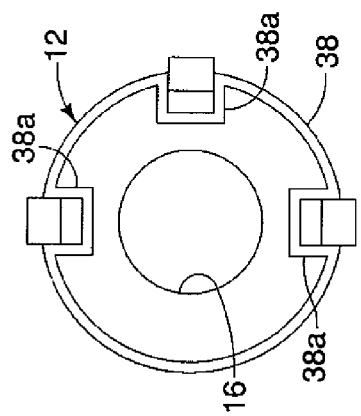
FIG. 4 is a cross-section view of the sensor assembly taken generally along the line 4-4 of FIG. 2.
Figure 3:
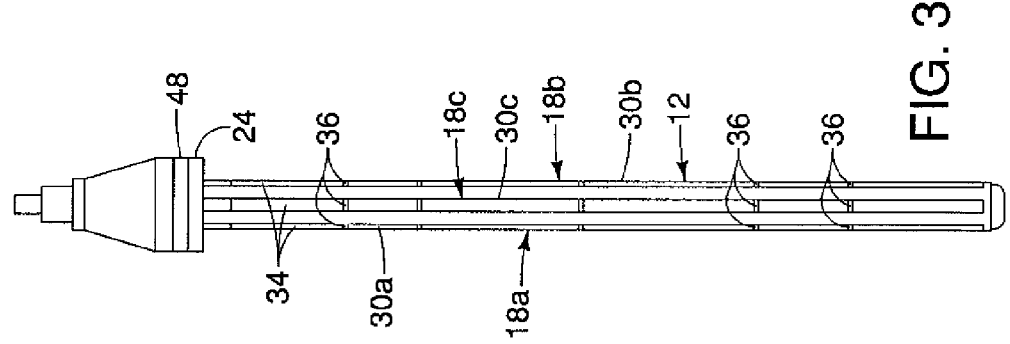
FIG. 3 is a side view of the sensor assembly of FIG. 2.
Figure 2:
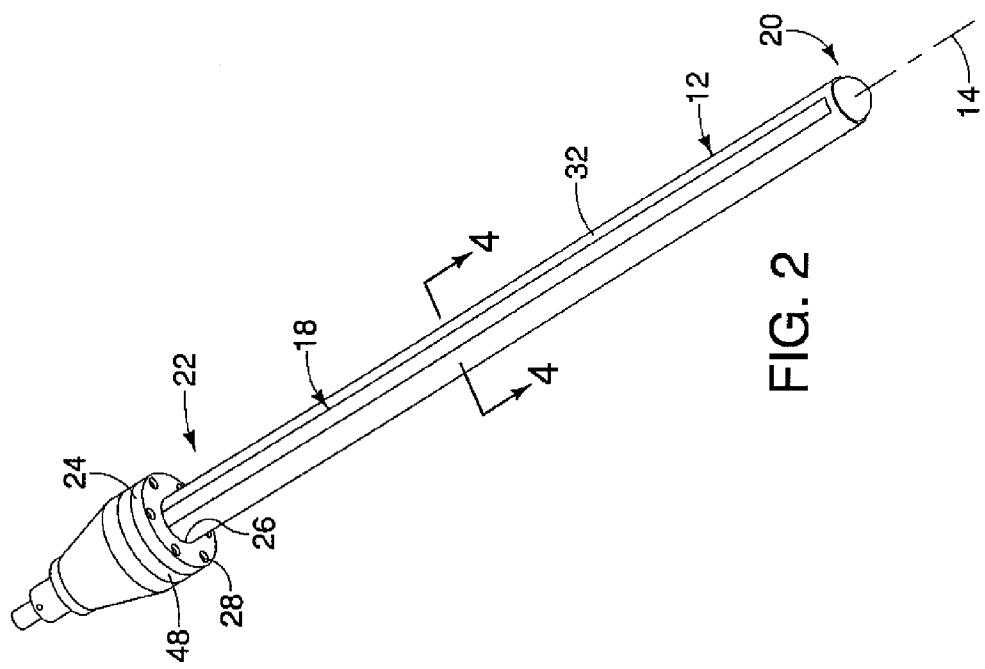
FIG. 2 is a perspective view of the sensor assembly of FIG. 1.

The present sensor assembly, when used in conjunction with an electronic signal converter, is a flowmeter to accurately measure the flow through a conduit or open channel and prevent moisture from entering the assembly.

Referring to FIGS. 1-9, the present sensor assembly 10 includes an elongated, cylindrical sensor body 12 made of a moisture impermeable material, such as metal, that has a longitudinal axis 14 and defines a hollow interior 16. In the illustrated embodiment, the body 12 is cylindrical and has a generally circular cross-section. It is also contemplated that the body may have other suitably shaped cross-sections. Furthermore, the metal sensor body 12 is made of stainless steel in the current embodiment but may be made out of any suitable impermeable material or combination of such materials. The body 12 defines a plurality of channels 18 that extend the length of the body parallel to the longitudinal axis 14. It should be appreciated that the body may define one channel or a plurality of channels and the channels 18 may each have a length that is less than the length of the body 12 or have any suitable length. Also, the channels 18 preferably each have the same length but it is contemplated that the channels may have different lengths. In the illustrated embodiment, the body 12 defines three channels 18a, 18b and 18c that are radially spaced from each other. The channels 18a, 18b and 18c may be equally spaced or spaced at different angles. In an embodiment, the channels are radially spaced at a designated angle from each other where the designated angle is 15° to 90°. It should be appreciated that one or more of the channels may be spaced at any suitable angle or distance from each other.

To prevent moisture from entering the body 12, the present sensor assembly is configured with a impermeable barrier to moisture. To create such a barrier, the channel or channels 18 are formed in the body to a designated depth that does not extend through to the hollow interior 16. This configuration ensures that there are no openings or open spaces between the channels 18 and the hollow interior 16 that would allow a fluid or moisture from the fluid to enter the blind hole as with existing sensor assemblies. Also eliminating any pathways for moisture to enter the interior of the sensor body, the present sensor assembly can be used to measure fluid flow in pipelines having fluid pressures up to 10,000 psi. As stated above, existing sensor assemblies are limited to fluid pressures of up to 1000 psi and therefore the present sensor assembly can be used in significantly more applications than existing sensor assemblies.

Additionally as stated above, the body 12 is made of a substantially impermeable material, such as stainless steel. This helps to further prevent fluid and moisture from entering the hollow interior 16. This is a significant advantage over existing sensor assemblies having bodies made of plastic or similar materials with higher porosities than metal where moisture is more easily absorbed by and passes through those materials over time causing damage to the internal circuitry such as the magnetic coils and wiring.

The body 12 has a first end 20 and an opposing second end 22. The first end 20 is closed by integrally forming the closed first end with the body or by welding a cap 24 onto the body to provide a hermetic seal between the cap and the body. The second end 22 includes a flange 24 that is connected to the body 12 by welding or any other suitable connection method. The flange 24 defines a central through-hole 26 having an inside diameter that is slightly greater than the outside diameter of the body. The flange 24 also defines six outer through-holes 28 for receiving fasteners as described below. The through-holes 28 are preferably equally spaced from each other but also may be spaced at different distances or angles relative to each other. It should also be appreciated that the flange 24 is not limited to six holes and may include any suitable number of through-holes or other holes.

A plurality of electrode assemblies 30 are mounted on the outer surface 32 of the body 12. Specifically, each electrode assembly 30 includes an electrically conductive strip such as metal strip 34 configured to be inserted into one of the channels 18 defined by the body 12. The metal strip 34 may be made of stainless steel or any other suitable electrically conductive material or combination of materials. Prior to insertion in the channels 18, a plurality of electrodes 36 are mounted on each metal strip 34. In another embodiment, the strip 34 itself can operate as an electrode by revealing one or more parts of the conductive surface of the strip through the insulating coating applied to the strip. In the illustrated embodiment, the electrodes 36 may be equally spaced along the strips 34 or spaced at other designated positions. The electrodes 36 are attached to the strips 34 using suitable conductive mechanical fastening methods for maintaining continuous metallic electrical continuity. Suitable wiring is connected to each strip 34 and extends along the body 12 within the respective channel 18 and through the through-hole 26 defined by flange 24 at the second end 22 of the body 12.

In the illustrated embodiment, two of the electrode assemblies 30 are sensing electrode assemblies 30a and 30b and are situated in the fluid flow at designated positions to take measurements of the flow. The third electrode assembly is a reference or ground electrode assembly 30c and is positioned to face upstream of the fluid flow. In an alternative embodiment, the third electrode assembly may be positioned in other orientations or positions within the fluid column.

It should be appreciated that for measuring flow in a conduit or open channel, the present sensor assembly 10 may have any suitable number of electrode assemblies 30 mounted on the outer surface 32 of the body 12. Two of the electrode assemblies are sensing electrode assemblies. It should be appreciated that any suitable even number of the electrode assemblies may be sensing electrode assemblies. One or more of the electrode assemblies may be a ground or reference electrode assembly and can be placed at any position relative to the direction of fluid flow in the conduit or open channel. Also, the sensing electrode assemblies 30a and 30b have the same number of electrodes 36 at the same positions whereas the ground electrode assembly 30c may have the same or a different number of electrodes as the sensing electrode assemblies and at the same or at different positions relative to the electrodes on the sensing electrode assemblies.

The non-conductive coating 38 is applied to the body 12 before the electrode assemblies 30a, 30b and 30c are mounted in the respective channels 18a, 18b and 18c defined by the body 12. The non-conductive coating or adhesive 38a is then applied to the electrode assemblies and the wiring to seal and secure the assemblies and wiring on the body and electrically isolate the assemblies and wiring from the body. Once the coating 38a has cured or set, any coating that is covering the perimeter surfaces of electrodes 36 is removed so that the electrodes can effectively sense the fluid flow and generate the associated electrical signals that are communicated to a signal converter associated with the flow meter.

A magnetic coil assembly or coil tree 40 generates the magnetic fields needed to measure the fluid flow and is configured to be inserted in the hollow interior 16 defined by the body 12. In the illustrated embodiment, the magnetic coil assembly 40 includes an elongated rod 42 having a first, free end 44 and an opposing second end 46 that includes a flange 48, and a the magnetic coils 50 that are attached to the rod. The flange 48 defines three through-holes 52 and three threaded recessed holes 54 that are spaced from each other. The six holes 52 and 54 align with the six outer through-holes 28 defined by the flange 24 connected to the body 12. The rod 42 of the coil assembly 40 may be made out of metal such as stainless steel, plastic or any suitable material or combination of materials. As shown in FIG. 8, the rod 42 is configured to be inserted in the hollow interior 16 of the body 12 and has a length that is at least equal to the length of the body. The magnetic coils 50 are attached to the rod 42 in positions that are aligned with the electrodes 36 associated with the sensing electrode assemblies 30a and 30b mounted to the outer surface 32 of the body 12.

Each of the magnetic coils 50 includes a bobbin 56 and a metal wire 58 wrapped about the bobbin for a designated number of turns. The bobbin 56 is preferably made of a magnetic metal such as iron but could be made with plastic or any other suitable material. As shown in FIG. 8, each bobbin 56 is secured to the rod 42 by fasteners. It should be appreciated that the bobbins 56 may also be secured to the rod 42 using an adhesive material, welding or any suitable connection method. The metal wire 58 is preferably copper wire but may be any suitable wire or combination of wires. The wire 58 is wrapped around the bobbin 56 a designated number of turns based on the strength of the magnetic field that needs to be generated as the strength of the magnetic field is directly proportional to the product of the number of turns of the wire and the electrical current in the wire. Suitable wiring is connected to each of the magnetic coils 50 to supply electrical current to the wire 58 in those coils.

In the illustrated embodiment, the outer magnetic coils 50b, 50c, 50d and 50e are wired together in series to the inner magnetic coil 50a. Suitable wire is connected to the inner magnetic coil 50a and extends along the rod 42 and through a hole 60 defined by the flange 48 at the second end 46 of the rod 42. It should be appreciated the magnetic coils 50 can be wired in series as described above or wired independently where the wiring for each coil extends along the rod 42 and through the hole 60 defined by the flange 48. The wiring is pre-coated or insulated to avoid inadvertent grounding with the coils 50 or rod 42 during use. Alternatively, the wiring may be coated with the non-conductive coating 38 described above. The wiring extends from the coils 50 to an electrical source (not shown) that supplies electricity to the coils. The electricity supplied to the coils 50 energizes the coils resulting in the magnetic fields described above.

A cable housing or protective enclosure is typically attached to the end of the coil assembly to provide cable termination that is sealed from moisture. In one embodiment illustrated in FIGS. 1, 2, 3 and 5A-8, the cable housing includes a cap 62 that is mounted on the second end 46 of the rod 42. The cap 62 includes three integrally formed parts: a flange portion 64, a conical portion 66 and a mounting member 68. The three parts may also be separately manufactured and joined together by welding or any other suitable connection method. The flange portion 64 has a generally circular shape and defines a through-hole 70 and three outer threaded holes 72 that are spaced apart from each other. The conical portion 66 has an inner end 74, an outer end 76, and an internal hollow area 78 that is in communication with the central hole 70 of the flange portion 64.

The mounting member 68 defines a through-hole 80 that is in communication with the hollow area 78 of the conical portion 66 and has a diameter that is less than a diameter of the outer end 76 of the conical portion. The wires or wiring from the coil assemblies 40 are fed through the through-hole 70 in the flange portion 64 and joined together in the hollow area 78 of the conical portion 66 as a single cable 82. The cable 82 extends from the hollow area 78 through the through-hole 80 of the mounting member 68 and to the signal converter.

The body 12, the coil assembly 40 and the cap 62 are connected together and installed as a single unit into a conduit such as pipeline 84. Specifically, the coil assembly 40 is inserted into the hollow interior 16 defined by the body 12. Threaded fasteners 86 are inserted through three of the aligned blind hole s 28 defined by the flange 24 of the body 12 and into the threaded holes 54 of the flange 48 of the coil assembly 40 to secure these components together. The wiring from the electrode assemblies 30 and the coil assembly 40 are fed into the cap 62 and connected together to form the cable 82 that extends through the mounting member 68 and is connected to the signal converter. Additional threaded fasteners 86 are inserted through the three other blind hole s 28 defined by the flange 24 of the body 12, three corresponding blind hole s 52 defined by the flange 48 of the coil assembly 40 and into the three recessed threaded holes 72 defined by the cap 62 to secure the body, the coil assembly and the cap together. In the illustrated embodiment, at least one o-ring seal member 88 is inserted between the flanges and the flange portion 24, 48 and 64 of the body, coil assembly and the cap to help prevent fluid and moisture from entering the sensor assembly 10.

The assembled sensor assembly 10 is then inserted into a port through a nipple compression seal 90 typically having a valve 92 that is connected to the pipeline 84 as shown in FIG. 1. The sensor assembly is secured in place by a mounting assembly 94. The mounting assembly 94 includes a cylindrical, spring housing 96, a mounting plate 98 connected to the spring housing and at least two elongated mounting rods such as elongated bolts 100. The spring housing 96 defines an interior space configured to receive a biasing member such as coil spring 102. A first end 104 of the coil spring 102 is configured to fit over the mounting member 68 of the cap 62 and engages the outer end 76 of the conical portion cable housing 66 and a second end 106 abuts the mounting plate 98. Preferably the spring housing 96 is integrally formed with the mounting plate 98 but may be connected to the mounting plate by welding or any suitable connection method. The mounting plate 98 defines a blind hole 108 for receiving the cable 82. Specifically, the cable 82 extends from the cap 62 and passes through the spring 102 in the spring housing 96 and through the blind hole 108 defined by the mounting plate 98 and then to the signal converter as described above. The bolts 100 are inserted through fastener holes 112 defined by the mounting plate 98 where first ends 114 of the bolts 110 are threaded and secured to corresponding threaded holes defined by a flange 116 associated with the nipple 90. The second ends 118 of the bolts 110 are secured to the mounting plate 98 by suitable washers 120 and lock nuts 122. The spring housing 96 has a diameter that is larger than the diameter of the spring 102 and the mounting member 68 of the cap 62 so that inward pressure on the housing causes it to move inwardly towards the cap and outside of the spring and the mounting member.

The sensor assembly 10 is installed in the pipeline 84 until the end 20 engages a wall 124 forming the pipeline. To ensure that the end 20 does not dislodge or move relative to the wall 124 during use due to the flow pressure in the pipeline 84, pressure is applied to the sensor assembly 10 by adjusting the mounting assembly 94. Specifically, the lock nuts 122 are tightened causing the mounting plate 98 and spring housing 96 to move inwardly toward the pipeline. As the mounting plate 98 moves inwardly, the spring 102 is compressed against the outer end 76 of the conical portion 66 of the cap 62. The compression of the spring 102 applies inward pressure on the sensor assembly 10, which in turn, causes the end 20 to press against the wall 124 with increasing force. The lock nuts 122 are tightened until the force of the end 20 on the wall 124 is between 400 to 600 psi so that the end does not move during use. When fully inserted, the coils 50 of the coil assembly 40 are aligned with the electrodes 36 on sensing electrode assemblies 30a and 30b to provide an accurate average of the velocity of the flow within the pipeline 84.

In the above embodiments, mounting assembly 94 is used to secure and hold the sensor assembly 10 in position relative to a conduit such as the pipeline 84, or an open channel (not shown). It should be appreciated that the mounting assembly 94 is generally used for conduits such as pipelines having fluid pressures up to 500 psi. Above 500 psi, the present sensor assembly is secured to the pipeline nipple or pipeline by welding it to the pipeline or by using other suitable high pressure seals. It should also be appreciated that the above embodiments are not limited to the mounting assembly 94 and that any suitable mounting assembly or mounting apparatus may be used to attach and secure the present sensor assembly to the conduit.

In operation, the magnetic coils 50 are energized to generate magnetic fields about each coil in the fluid flow. As the fluid flows through the respective magnetic fields, the fluid produces a voltage that is sensed by the electrodes 36 on the sensing electrode assemblies 30a and 30b. The sensed voltages are communicated to a signal converter (not shown), which is associated with the flow meter, as electrical signals from the electrodes. The electrical signals are converted to an average flow velocity by the signal convertor and are displayed on a display screen of the signal convertor, or a flow meter monitor or computer screen.

As described above, the body 12 and the strips 34 are preferably coated with the non-conductive coating 38 and 38a to electrically isolate each component of the sensor assembly. The combination of the body 12 made of the impermeable material and the elimination of any openings or spaces between the electrodes 36 and the hollow interior 16 of the body 12 all help to significantly inhibit fluid and/or moisture from entering the body, damaging the internal circuitry and negatively affecting the measurement capabilities of the magnetic coils 50. The present sensor assembly 10 therefore is more durable and provides accurate flow measurements with minimal degradation to the magnetic coils and other internal components of the sensor assembly.

Referring to FIG. 9, another embodiment of the sensor assembly 10' is illustrated where the sensor assembly includes a body 12' made of a moisture impermeable material that defines a channel 18' in which an electrically conductive strip 34' is mounted having one electrode 36'. A coil assembly 40' is inserted into a hollow interior defined by the body where the coil assembly includes one magnetic coil 50' that it aligned with the electrode 36' when the coil assembly is inserted into the body. The sensor assembly 10' operates as described above to accurately measure the flow velocity in a conduit while preventing moisture from entering the body and damaging the internal circuitry.

In the above embodiments, the sensor assembly 10 is removable from the pipeline 84 so that it can be cleaned, inspected, repaired and/or replaced as needed. Furthermore, the coil assembly 40 can be inserted into and/or removed from the body 12 so that it can be repaired and/or replaced. This reduces assembly and repair costs because the entire sensor assembly 10 does not need to be replaced if there is a malfunction or damage to the coil assembly 40, the magnetic coils 50 or other parts of the assembly.

While particular embodiments of the present sensor assembly have been described herein, it will be appreciated by those skilled in the art that changes and modifications may be made thereto without departing from the invention in its broader aspects.

What is claimed is:

1. A sensor assembly for a fluid flowmeter comprising:
a body having opposing ends and a hollow interior, one of said ends including an opening in communication with said interior, said body configured to have a moisture impermeable barrier that prevents moisture from entering said interior at extreme fluid pressures;
at least one electrode mounted on said body;
a coil assembly configured to be removably inserted through said opening and into said hollow interior of said body, said coil assembly including at least one magnetic coil electrically isolated from said at least one electrode when said coil assembly is axially inserted into said hollow interior of said body.

2. The sensor assembly of claim 1, said body including an outer surface, said at least one electrode being mounted on said outer surface.

3. The sensor assembly of claim 1, wherein said body is made of a substantially moisture impermeable material.

4. The sensor assembly of claim 3, wherein said moisture impermeable material is stainless steel.

5. The sensor assembly of claim 1, wherein said body defines at least one channel and said at least one electrode is mounted in said channel.

6. The sensor assembly of claim 5, further comprising an electrically conductive strip configured for insertion in said channel, said at least one electrode being mounted on said strip.

7. The sensor assembly of claim 1, further comprising an electrically non-conductive coating applied to at least one of said body and said at least one electrode.

8. The sensor assembly of claim 1, further comprising a cap connected to said coil assembly, said cap including a biasing member for biasing the body against a wall of a conduit.

9. The sensor assembly of claim 1, further comprising a plurality of electrodes, said electrodes being mounted on said body.

10. The sensor assembly of claim 9, wherein said body defines a plurality of channels and said electrodes are mounted in each of said channels.

11. The sensor assembly of claim 1, wherein said extreme fluid pressures include pressures of 500 to 10,000 psi.

12. A sensor assembly for a fluid flowmeter comprising:
a cylindrical body having an outer surface, said body defining a longitudinal axis, a central blind hole and two channels, said two channels being parallel to said longitudinal axis and radially spaced at a designated angle from each other on said outer surface;
a sensing electrode assembly mounted in one of said two channels;
a ground electrode assembly mounted in said other of said two channels, at least one of said sensing electrode assembly and said ground electrode assembly including a plurality of spaced electrodes;
a coil assembly configured to be removably, axially inserted in said central blind hole of said body, said coil assembly including a plurality of magnetic coils, each of said magnetic coils being electrically isolated from and aligned with one of said plurality of electrodes on said sensing electrode assembly when said coil assembly is inserted into said central blind hole of said body.

13. The sensor assembly of claim 12, wherein said body is made of metal.

14. The sensor assembly of claim 12, further comprising an electrically non-conductive coating applied to at least one of said body, said sensing electrode and said ground electrode.

15. The sensor assembly of claim 12, wherein said designated angle is 15° to 90°.

16. The sensor assembly of claim 12, wherein said body defines an additional channel that is spaced from said two channels.

17. The sensor assembly of claim 16, further comprising an additional sensing electrode assembly mounted in said additional channel, said additional sensing electrode assembly including a plurality of spaced electrodes aligned with said electrodes on said sensing electrode assembly.

* * * * *